United States Patent Office 3,507,612
Patented Apr. 21, 1970

3,507,612
BACTERICIDAL WATER STERILIZER FOR FISH ROE INCUBATORS
Evgenia Mikhailovna Kokhanskaya and Vladislav Antonovich Teodorovich, Moscow, and Ivan Alexandrovich Sadov, deceased, late of Moscow, by Evgenia Mikhailovna Kokhanskaya, Olga Ivanovna Sadova, and Nadezhda Ivanovna Sitnik, administrators, Novosibirsk, U.S.S.R., assignors to Institut Morfologil Zhivotnykh Imeni A.N. Severtsova, Moscow, U.S.S.R.
Filed July 7, 1967, Ser. No. 651,929
Int. Cl. A61l 3/00
U.S. Cl. 21—102          1 Claim

ABSTRACT OF THE DISCLOSURE

A bactericidal water sterilizer comprises a duct of open channel shape with partitions dividing the duct into troughs intercommunicated by a zigzag passage. Trapezoidal shaped steps are installed in each trough in spaced relation from one another and extend transversely of the partitions. The steps are of diminishing width upwardly and vertical gates are located between the steps in spaced relation from the bottom of the duct. As a consequence of the steps, and an arrangement wherein they diminish in height in the direction of water flow, different water levels are formed in the various compartments which are formed to effect the required velocity of the water flow in the sterilizer. Installed above the steps in the duct are bacteria sterilizing lamps for sterilizing the water flowing through the duct.

---

This invention relates to bactericidal devices for sterilization of liquids, and more particularly to a bactericidal water sterilizer for fish roe incubators.

Known in the art are bactericidal water sterilizers for incubators containing fish roe with gluey egg membranes, said sterilizers having the form of a duct divided by partitions into troughs intercommunicated by a zigzag passage, and provided with 26 lamps located above the duct (Author's certificate No. 143,619, U.S.S.R.).

Disadvantages of the known sterilizers are their bulkiness, a large number of bactericidal lamps and a long period of irradiation, of the water to be sterilized, that is 12 minutes.

An object of this invention resides in eliminating the aforementioned disadvantages.

The main object of the invention is to provide a bactericidal water sterilizer for fish roe incubators characterized by small size and high sterilization efficiency that is a radically reduced period of irradiation.

This object has been achieved by providing a bactericidal sterilizer for fish roe incubators, said sterilizer having the form of a duct divided by partitions into troughs intercommunicated by a zigzag passage, and provided with lamps installed above the duct.

According to the invention, it is practicable to place steps in the troughs at a certain distance from one another, installing lamps above said steps and providing vertical gates between said steps, these gates coming short of the duct bottom.

The cross section of the steps may have the form of a trapezoid with the smaller base directed upwards.

Moreover, the steps can be of different height, becoming lower in the direction of the water flow.

Figure 1:
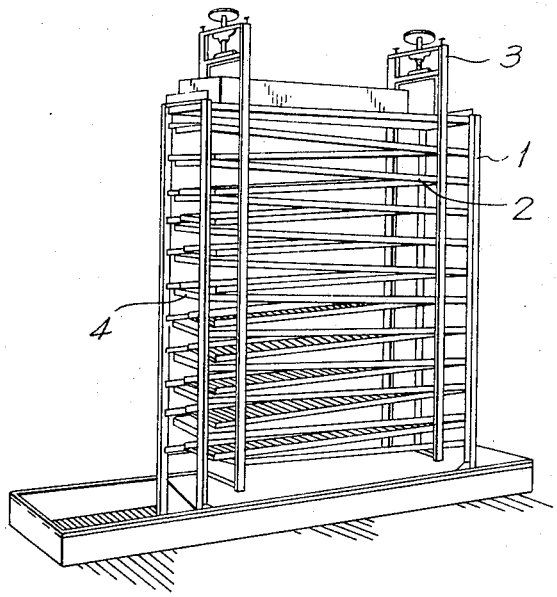
Figure 2:
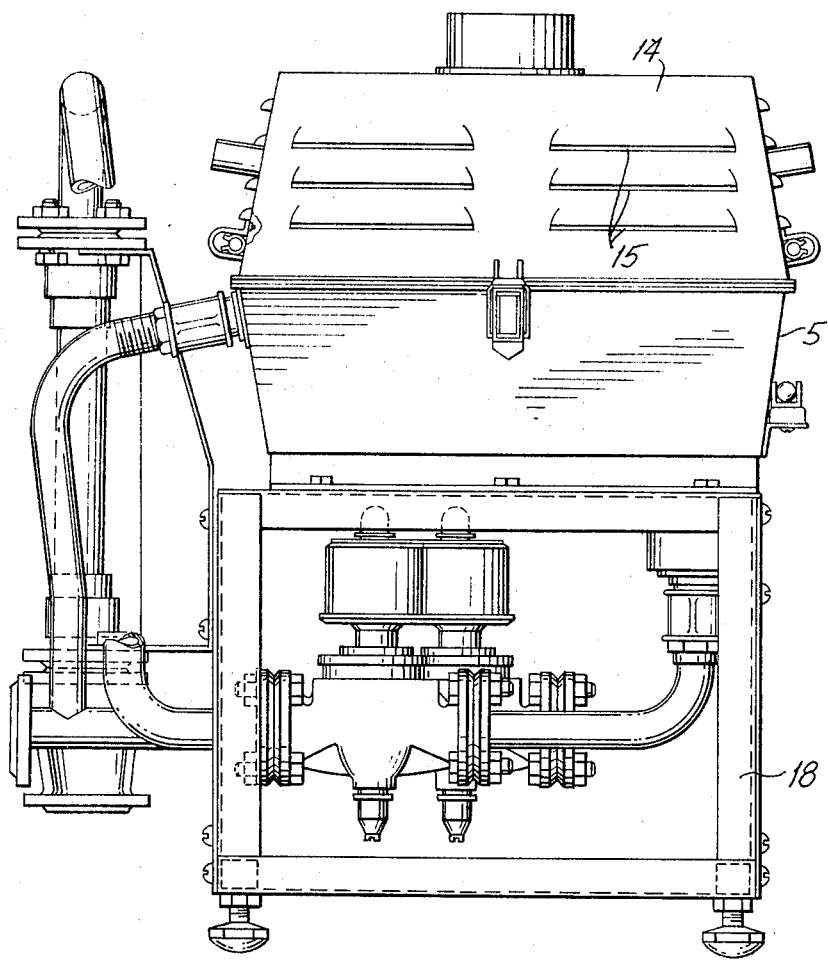
Figure 3:
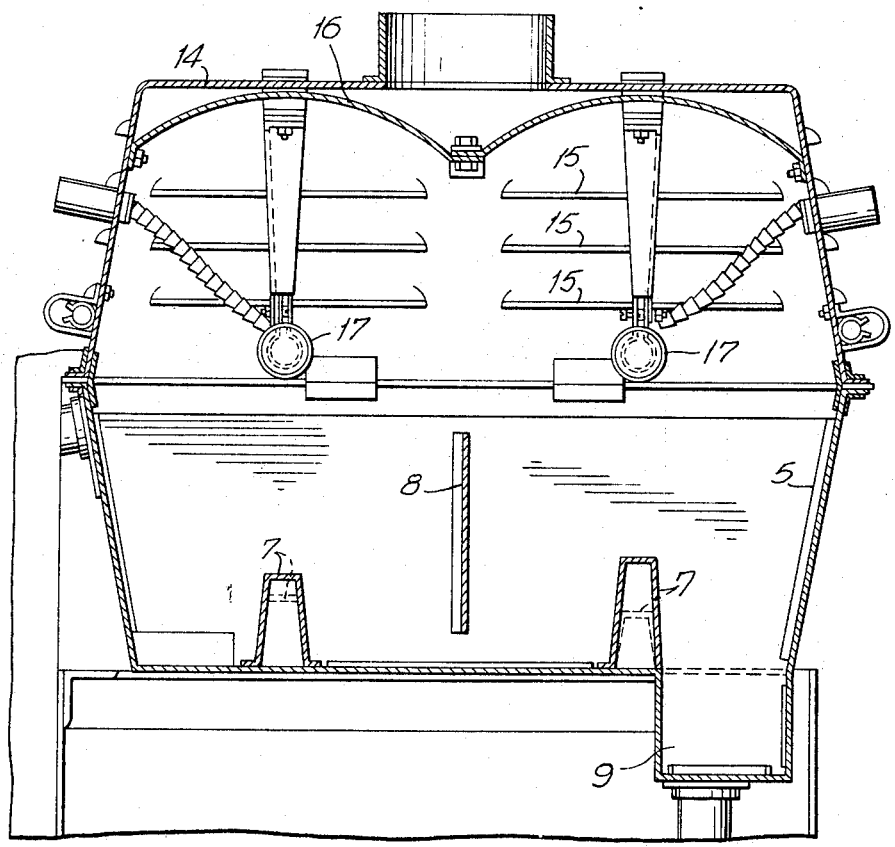
Figure 4:
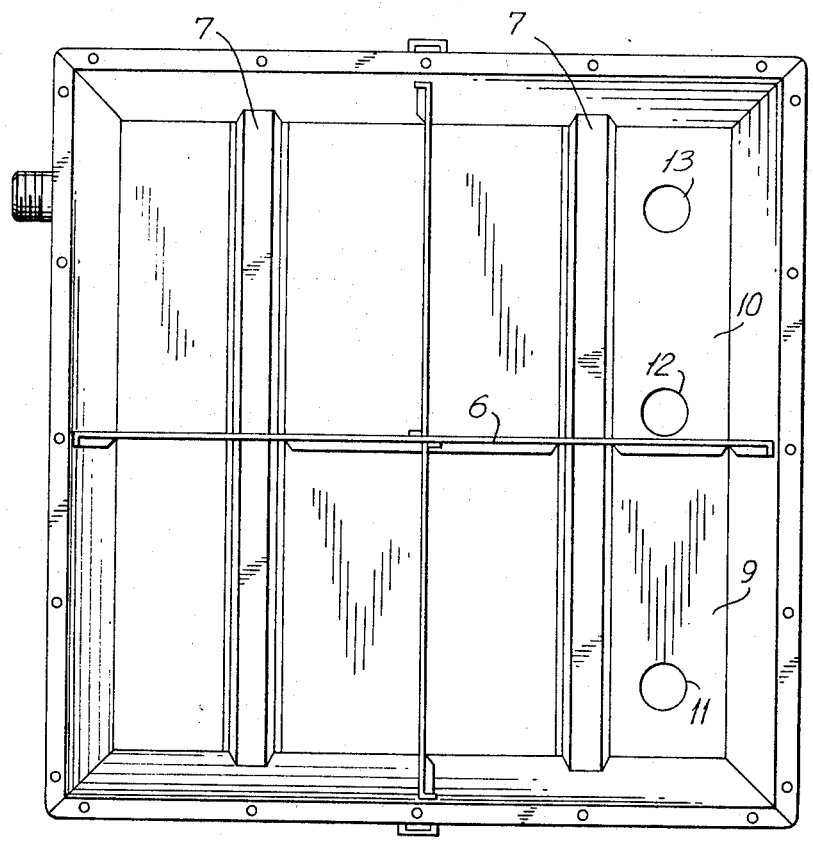

Other objects and advantages of the invention will become apparent from the description that follows and the appended drawings, wherein:

FIG. 1 is a perspective tray incubator;
FIG. 2 is an elevation view of a bactericidal sterilizer according to the invention;
FIG. 3 is a section through the bactericidal sterilizer;
FIG. 4 is a plan view of the duct of the bactericidal sterilizer.

The small-size bactericidal sterilizer is designed for sterilization of water entering a tray incubator in which fish eggs develop in an adherent state without being preliminarily degummed, under the conditions featuring maximum similarity to the natural ones.

The tray incubator consists of a frame 1 (FIG. 1), guide angles 2, lifting mechanisms 3 and trays 4.

The tray incubator is designed for incubation of sturgeon roe though it can also be used for other species of fish having sticky eggs. The operating principle of this incubator is based on the utilization of the embryonic property, that is stickiness of egg membranes, which distinguishes this incubator radically from other homemade and foreign incubators used in pisciculture, in which the fish eggs develop in a suspended state.

The tray incubator occupies an area of 0.6 m.$^2$ and holds 16.8 kg. of sturgeon roe (700–750 thousand eggs) placed by a special distributor on 20 trays with a total incubation area of 10.5 m.$^2$.

The above-mentioned incubator is more roomy than all the other similar apparatus employed in pisciculture. The rate of water flow through the incubator is 300 cm.$^3$/sec. The apparatus uses sterile water which excludes the adverse effect of the saprolegnia fungus parasitizing on roe and steps up the larvae hatching percentage. The hatching percentage varies from 85 to 92 depending on the quality of the roe. A single batch yielded from one incubator exceeds 500,000–600,000 larvae.

The larvae are hatching outside the incubator, in rearing ponds of any construction in which the trays with roe are placed as soon as the first larvae start hatching. This eliminates the necessity of catching the larvae in the incubator, counting them and transferring into ponds, thereby considerably reducing the number of servicing personnel during hatching.

Incubation of roe in an adherent state in a tray incubator (without preliminary degumming) completely eliminates the possibility of traumatization of roe during incubation and of larvae during hatching.

The quantity of larvae hatched in one tray is quite sufficient for charging one rearing pond of 2.5 m. diameter.

The number of hatched larvae and the hatching percentage are determined by counting the larvae in a sample of roe taken from the tray at the beginning of hatching.

The conditions of development of fish eggs in the tray incubator meet most closely the biological requirements of the embrios and ensure the best gas exchange for them.

An advantage of the tray incubator over other incubation apparatus lies in the possibility of concurrent incubation of roe of various fish species, placed in different trays. In such a case the charging of individual trays does not affect the functioning of the incubator as a whole and can be performed at any moment, regardless of the stage of development of the roe in other trays.

The water is sterilized in a bactericide sterilizer 400 x 400 x 670 mm. in size, with a capacity of 1 m.$^3$/hr.

The bactericide sterilizer is a duct 5 (FIG. 2) whose bottom is divided by one longitudinal partition 6 (FIG. 4) into troughs.

Each trough is provided with steps 7 (FIG. 3) and vertical gates 8 coming short of the duct bottom. The troughs and steps 7 ensure uniform mixing of water in the apparatus for effective irradiation thereof.

The steps 7 have the shape of a trapezoid, whose smaller base is directed upwards. The height of the steps 7 varies, diminishing in the direction of the water flow, which creates different water levels in the compartments, thereby ensuring the required velocity of the water flow in the sterilizer.

The bottom of the duct 5 has two hatches 9 and 10 (FIG. 4) with the inlet and outlet openings for the water to be sterilized. The water enters the hatch 9 through the inlet 11. Having passed through the duct 5, the water leaves the apparatus through the outlet 12 of the hatch 10. The hatch 10 has also a hole 13 for feeding the sterilized water into the incubator.

The bactericidal sterilizer is provided with a cover 14 (FIGS. 2 and 3) fitted with ventilating shutters 15.

Fastened to the inside surface of the upper part of the cover 14 are two spherical metal reflectors 16 (FIG. 3) with lamps 17 fastened to their inner side on insulators (one lamp per reflector). The lamps 17 are positioned along the axis of the steps 7 at a distance of 160 mm. from the bottom of the duct 5. The sterilizer is mounted on a support 18 (FIG. 2) which, in turn, is mounted on the tray incubator frame 1.

The time of irradiation of the water, passing through the sterilizer, is 24 seconds.

The basic object of the bactericidal sterilizer is sterilization of the water entering the tray incubator for killing the spores of saprolegnia contained in the river water.

However, the time of exposure, specified above, is sufficient not only for killing the spores of the saprolegnia fungus parasittizing on fish eggs but for sterilization of other organisms, in particular such fish parasites as ichthyophthirius, cercaria, trichodyne, gyrodactilus, etc.

Therefore, the bactericidal sterilizer can be used not only for incubation of the eggs of sturgeon and osseous fish species, but also in the period of rearing of the osseous fish fry which are particularly susceptible to infection by these parasites when reared in unsterile water.

Thus, the bactericidal sterilizer can be used in fish farming firstly, for incubation of sturgeon eggs in tray incubators, secondly—during incubation of roe and rearing of larvae of osseous fish and, thirdly in commercial and amateur breeding of decorative fish.

The bactericidal incubator requires no special space since it can be mounted directly on the tray incubator frame.

The water irradiation time by means of two lamps of a small-size bactericidal sterilizer is 24 seconds at a 300 cm.³/sec. rate of water flow which means that the irradiation efficiency is increased by 30 times.

The bactericidal sterilizer is equipped with automatic units which control a predetermined rate of flow, shut off the supply of water into the sterilizer and incubator if a lamp burns out or in case of a power supply failure, discharge unsterile water and produce signals about proper functioning of the sterilizer or its failure.

These automatic units guarantee the dependability of the sterilizer, relieving the servicing personnel from continuous watching of the sterilizer, and ensuring its convenient operation. The automatic equipment is installed under the duct 5 of the bactericide sterilizer in the frame 18 (FIG. 3) and is controlled from a control panel.

What we claim is:

1. A bactericidal water sterilizer for incubators containing fish roe with gluey egg membranes, said sterilizer comprising: a duct of open channel shape having an inlet for water to be purified and an outlet for purified water, partitions dividing said duct into troughs intercommunicated by a zigzag passage; steps installed in said troughs at a certain distance from one another and extending transversely of said partitions, said steps having a trapezoidal shape and diminishing in width upwardly, the steps being of different height, and becoming lower in the direction of the water flow; vertical gates located between said steps and spaced from the bottom of said duct, said gates extending parallel to said steps; and bacteria sterilizing lamps installed above the steps in said duct for sterilizing the water flowing through the duct.

References Cited

UNITED STATES PATENTS

| | | | |
|---|---|---|---|
| 1,132,266 | 3/1915 | Henri et al. | 21—101 |
| 1,193,143 | 8/1916 | Henri et al. | 21—101 |
| 1,200,940 | 10/1916 | Henri et al. | 250—48 |
| 1,954,065 | 4/1934 | Bragg | 21—101 |
| 2,065,055 | 12/1936 | Berndt et al. | 250—48 |
| 2,139,657 | 12/1938 | Baeckler | 250—48 |
| 2,280,841 | 4/1942 | Ogden | 21—101 |
| 2,340,890 | 2/1944 | Lang et al. | 21—101 |
| 2,669,661 | 2/1954 | Riddiford et al. | |
| 3,182,193 | 5/1965 | Ellner et al. | 21—102 XR |

MORRIS O. WOLK, Primary Examiner

B. S. RICHMAN, Assistant Examiner

U.S. Cl. X.R.

21—54; 250—43, 48